(12) United States Patent
Rector et al.

(10) Patent No.: US 8,776,094 B2
(45) Date of Patent: Jul. 8, 2014

(54) RUNTIME SYSTEM

(75) Inventors: Brent E. Rector, Redmond, WA (US);
Elliot H. Omiya, Kirkland, WA (US);
Jerry J. Dunietz, Seattle, WA (US);
Martyn S. Lovell, Seattle, WA (US);
Ales Holecek, Kirkland, WA (US);
Mahesh Prakriya, Redmond, WA (US);
Stephen C. Rowe, Bellevue, WA (US);
James F. Springfield, Woodinville, WA (US); Noel R. Cross, Seattle, WA (US);
Tassaduq H. Basu, Redmond, WA (US);
Patrick H. Dussud, Redmond, WA (US); Raja Krishnaswamy, Redmond, WA (US); Steven Edward Lucco, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 175 days.

(21) Appl. No.: 13/207,806

(22) Filed: Aug. 11, 2011

(65) Prior Publication Data

US 2013/0042258 A1 Feb. 14, 2013

(51) Int. Cl.
*G06F 3/00* (2006.01)
(52) U.S. Cl.
USPC .......................................................... 719/328
(58) Field of Classification Search
USPC .......................................................... 719/328
See application file for complete search history.

(56) References Cited

U.S. PATENT DOCUMENTS

| | | | |
|---|---|---|---|
| 5,097,533 A | 3/1992 | Burger et al. | |
| 6,813,770 B1 | 11/2004 | Allavarpu et al. | |
| 7,458,082 B1 | 11/2008 | Slaughter et al. | |
| 7,721,254 B2 | 5/2010 | Relyea et al. | |
| 2004/0201600 A1 | 10/2004 | Kakivaya et al. | |
| 2004/0243605 A1* | 12/2004 | Bernstein et al. | 707/100 |
| 2004/0260691 A1* | 12/2004 | Desai et al. | 707/4 |
| 2005/0091671 A1* | 4/2005 | Deem et al. | 719/328 |
| 2005/0262181 A1 | 11/2005 | Schmidt et al. | |
| 2006/0004709 A1* | 1/2006 | Borthakur et al. | 707/3 |
| 2006/0277194 A1* | 12/2006 | Britt et al. | 707/10 |

OTHER PUBLICATIONS

"Overview of CORBA", Retrieved at <<http://www.cs.wustl.edu/~schmidt/corba-overview.html>>, Retrieved Date: May 5, 2011, pp. 4.
"Jason Description", Retrieved at <<http://jason.sourceforge.net/Jason/Description.html>>, Retrieved Date: May 5, 2011, pp. 2.
"Common Desktop Environment (CDE) 2.1", Retrieved at <<http://www.opengroup.org/desktop/cde/cde.data.sheet.htm>>, Retrieved Date: May 5, 2011, pp. 11.
"Introducing BEA Tuxedo", Retrieved at <<http://download.oracle.com/docs/cd/E12531_01/tuxedo100/overview/overview.html>>, Retrieved Date: May 5, 2011, pp. 14.

(Continued)

*Primary Examiner* — Emerson Puente
*Assistant Examiner* — Steven Do
(74) *Attorney, Agent, or Firm* — Tony Azure; Andrew Sanders; Micky Minhas (57) ABSTRACT

Various embodiments provide an ability to describe, independent of a programming language, one or more interfaces associated with an operating system. Alternately or additionally, a compiler associated with a specific programming language can be configured to map the independent interface description(s) to the specific programming language. In some embodiments, an application can be configured to programmatically determine one or more interfaces of the operating system.

19 Claims, 5 Drawing Sheets

(56) References Cited

OTHER PUBLICATIONS

Simon, et al., "Full Eiffel on .NET", Retrieved at <<http://se.ethz.ch/~meyer/publications/msdn/eiffel-net/eiffel-net.pdf>>, Retrieved Date: May 5, 2011, pp. 1-25.

"International Search Report", Mailed Date: Jul. 23, 2012, Application No. PCT/US2011/055492, Filed Date: Oct. 8, 2011, pp. 12.

"Exposing COM Components to the .NET Framework", Retrieved at: <<http://web.archive.org/web/20080919085327/http://msdn.microsoft.com/en-us/library/z6tx9dw3.aspx>>, Nov. 2007, 1 page.

"Visual Basic Programming Guide: Introduction to COM Interop", Retrieved at: <<http://web.archive.org/web/20090528114339/http://msdn.microsoft.com/en-us/library/kew41ycz.aspx>>, May 2009, 2 pages.

".NET Framework Developer's Guide, Interop Marshaling", Retrieved at: <<http://web.archive.org/web/20090603052427/http://msdn.microsoft.com/en-us/library/04fy9ya1.aspx>>, Jun. 2009, 2 pages.

".NET Framework Developer's Guide, Interoperating with Unmanaged Code", Retrieved at: <<http://web.archive.org/web/20090717103711/http://msdn.microsoft.com/en-us/library/sd10k43k.aspx>>, Jul. 2009, 2 pages.

".NET Framework Tools, Type Library Importer", Retrieved at: <<http://web.archive.org/web/20090707213143/http://msdn.microsoft.com/en-us/library/tt0cf3sx.aspx>>, Jul. 2009, 5 pages.

* cited by examiner

RUNTIME SYSTEM

BACKGROUND

Computers today often times include operating systems to manage access to hardware and software resources. In turn, the operating systems can include various types of interfaces, such as an Application Programming Interface (API), to enable a programmer and/or application access these resources. In some cases, interfaces are programmed with a specific programming language in mind When a client application is written in the specific programming language, the client application can access the interfaces in ways native to the specific programming language. However, client applications that are written in a language different from that of the interfaces may sometimes end up utilizing additional code and/or wrapper functions in order to call into the interface.

Typically, the interfaces are documented external to the operating system. In order to successfully call an interface, as well as write wrapper functions, a programmer consults the external documentation to determine what interfaces are available, what are the associated call parameters, etc. New versions of an operating system can include new interfaces, modifications to old interfaces, as well removal of obsolete interfaces. Therefore, in order to maintain a current set of APIs, the programmer has to consult the external documentation on each new version of the operating system. This can sometimes result in a delay between when an interface is released in an operating system, and when the interface can be included in a program.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide an ability to describe, independent of a programming language, one or more interface(s) associated with an operating system. Alternately or additionally, a compiler associated with a specific programming language can be configured to map the independent interface description(s) to the specific programming language. In some embodiments, an application can be configured to programmatically determine one or more interface(s) of the operating system.

Some embodiments provide an ability to model one or more interface(s) of an operating system, in an object-oriented manner, utilizing an abstract type system. In some embodiments, an extended Interface Definition Language (IDL) can include syntax to describe relationships between one or more interface(s). In some embodiments, a binary contract can be configured to expose behavior associated the abstract type system.

BRIEF DESCRIPTION OF THE DRAWINGS

The same numbers are used throughout the drawings to reference like features.

DETAILED DESCRIPTION

Overview

Various embodiments provide an ability to describe, independent of a programming language, one or more interface(s) associated with an operating system. An abstract type system, in combination with an Interface Definition Language (IDL), can be configured to describe and/or define the interfaces. In some embodiments, an interface can be described in an object-oriented manner. Alternately or additionally, a compiler associated with a specific programming language can be configured to map the language-independent interface description(s) to appropriate constructs in the specific programming language. Alternately or additionally, a programming language application runtime environment can be configured to dynamically (e.g. during runtime execution) map the language-independent interface description(s) to appropriate constructs in the specific runtime environment. In some embodiments, an application can be configured to programmatically determine the independent interface description(s). In some cases, the independent interface description(s) can be stored in a machine-readable format.

In the discussion that follows, a section entitled "Operating Environment" is provided and describes one environment in which one or more embodiments can be employed. Following this, a section entitled "Operating System Component Access" describes an architecture that enables multiple programming languages to access system components programmatically. Next, a section entitled "Modeling Object-Oriented Languages with an Abstract Type System" describes how an abstract type system can be used, in conjunction with an extended IDL, to describe operating system interfaces in an object-oriented manner. Last, a section entitled "Example System" describes an example system that can be utilized to implement one or more embodiments.

Having provided an overview of various embodiments that are to be described below, consider now an example operating environment in which one or more embodiments can be implemented.

Operating Environment

Figure 1:
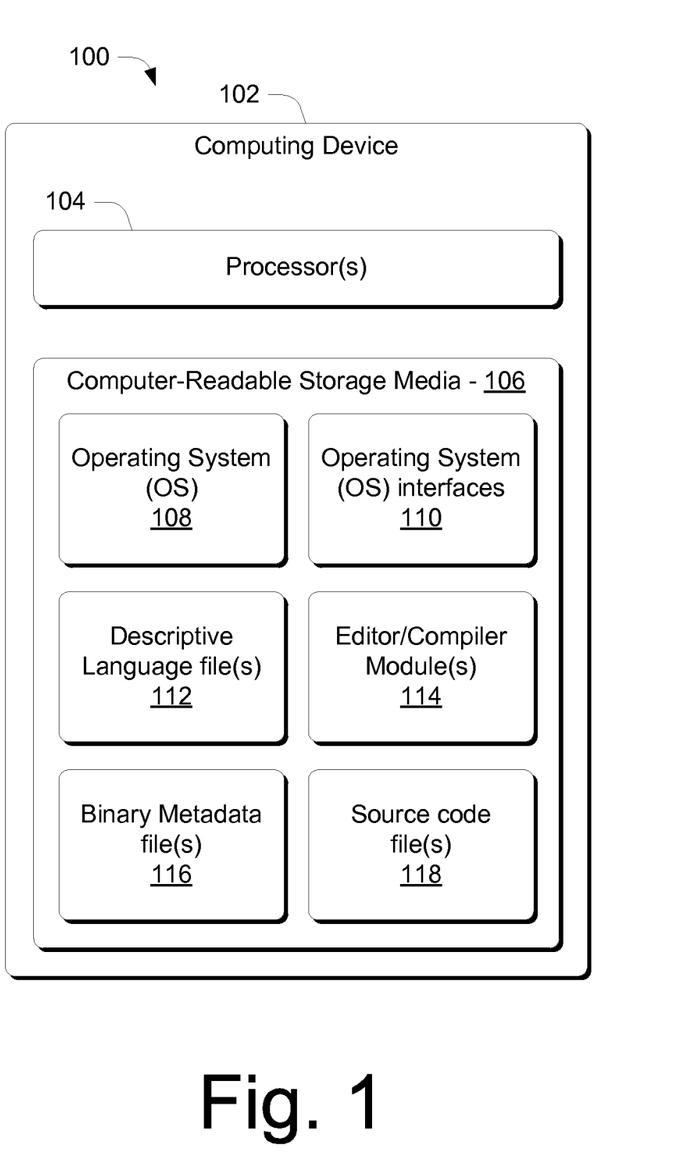
FIG. 1 illustrates an operating environment in which various principles described herein can be employed in accordance with one or more embodiments.

FIG. 1 illustrates an operating environment in accordance with one or more embodiments, generally at 100. Environment 100 includes a computing device 102 having one or more processor(s) 104, and one or more computer-readable storage media 106. The computer-readable storage media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 5.

In addition, computing device 102 includes operating system (OS) 108 and associated operating system interface(s) 110. While shown as separate modules, it is to be appreciated and understood that operating system 108 and operating system interface(s) 110 can be implemented as separate modules, combined modules, or any combination thereof without departing from the scope of the claimed subject matter. Operating system 108 represents functionality configured to manage software and/or hardware resource(s) of computing device 102. Operating system interface(s) 110 represents programmatic access to services and/or functionality provided by operating system 108, such as memory management, file management, services, functions, resource management, peripheral device management, and the like.

Computing device 102 also includes one or more descriptive language file(s) 112, which represent one or more file(s) configured to describe one or more interface(s). In some embodiments, an interface can be associated with an operating system, such as operating system interface(s) 110. The descriptive language files can describe the interfaces using any suitable description, markup language, and/or syntax, such as with an Interface Definition Language (IDL), eXtensible Markup Language (XML), and the like.

In addition, computing device 102 also includes one or more editor/compiler module(s) 114. In some embodiments, editor/compiler module 114 represents functionality that reads and/or interprets the descriptive language file(s) 112 and generates an output, such as one or more binary metadata file(s) 116, based upon file(s) 112. Binary metadata file(s) 116 represents one or more machine-readable file(s) that include information associated with operating system interface(s) 110 and/or operating system 108, such as input parameter types, parameter calling order, relationships between the interfaces, and the like.

Alternately or additionally, editor/compiler module(s) 114 represents functionality that reads and/or deciphers one or more source code file(s) 118. Source code file(s) 118 correspond to one or more file(s) containing programming statements associated with at least one programming language. In some cases, source code file(s) 118 can include statements that call to one or more operating system interface(s). Editor/compiler module(s) 114 interprets the source code file(s) 118, and generates machine-executable code based upon the source files(s).

Computing device 102 can be embodied as any suitable computing device such as, by way of example and not limitation, a desktop computer, a portable computer, a notebook computer, a handheld computer such as a personal digital assistant (PDA), cell phone, and the like.

Having described an example operating environment, consider now a discussion of exposing operating system components programmatically to one or more programming language(s).

Operating System Component Access

Applications running on a computing device oftentimes utilize features provided by an operating system running on the computing device. The operating system can enable simplified access to associated resources on the computing device, as well as provide services. Sometimes, these features, services, and/or resources can be programmatically accessed. However, if the operating system exposes these functionalities in a programming language format that is different than a programming language in which an application is written, a programmer will typically write wrapper functions to aid in the transition between the different programming languages. For example, consider an interface that has been written and/or exposed as a flat, exported, "C" function. A C# or Visual Basic programmer desiring to use the "C"-style function can include special statements and/or additional code in order to enable their programming language to successfully call the "C"-style function. As a consequence, applications written in a different programming language from the exposed interfaces do not have access to the interfaces until the additional statements and/or wrapper functions are written.

Various embodiments provide an ability to describe, independent of a programming language, one or more interface(s) associated with an operating system. Describing an interface independent of a programming language enables multiple programming languages easy access to the interface. When a programming language learns how to interpret the language-independent description of the interface, this knowledge can be applied to existing and future interfaces that use a language-independent description. In some embodiments, an interface can be described using an abstract type system. In turn, a specific programming language, or an associated programming language compiler, can map the abstract type system to its associated type system to interpret and/or access the interface.

Figure 2:
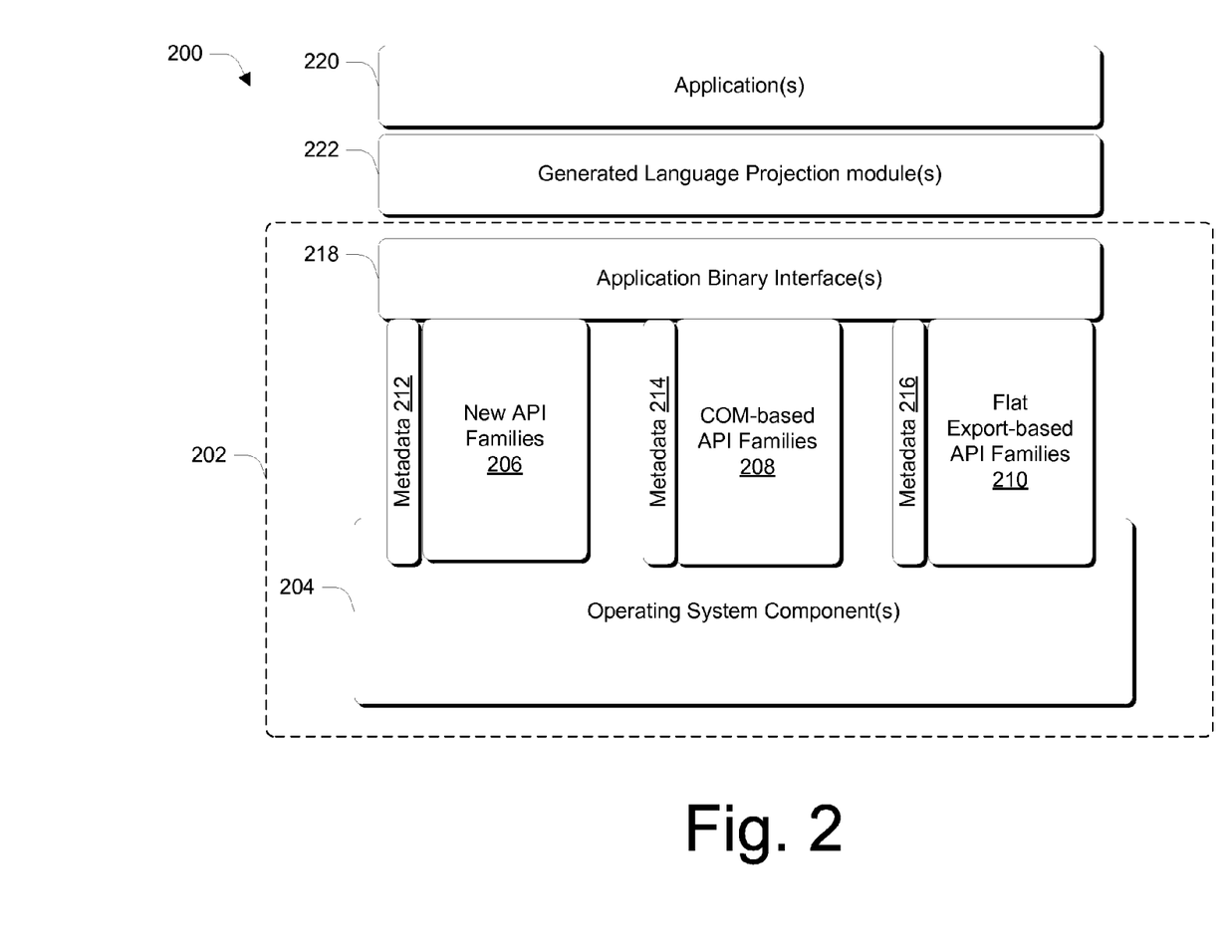
FIG. 2 illustrates an architecture in accordance with one or more embodiments.

Consider FIG. 2, which illustrates an architecture 200, in accordance with one or more embodiments. Architecture 200 includes operating system 202, which can be configured to execute on a computing device. It should be understood that for the sake of brevity, operating system 202 is not illustrated in its entirety. Operating system 202 includes one or more operating system component(s) 204 configured to manage resources associated with a computing device. In some embodiments, operating system component(s) 204 can provide programmatic access to the resources, as well as one or more service(s) and/or features associated with managing the resources. Operating system component(s) 204 can also include basic elements associated with operating system 202, as well as complex elements built from the basic elements.

In some embodiments, operating system component(s) 204 can be exposed via one or more interface(s), such as an API. In this example, operating system 202 includes new API families 206, COM-based API families 208, and flat export based API families 210. New API families 206 represent one or more related APIs where functionality (i.e. classes, interfaces, methods, properties, events, and the like) is described directly using the abstract type system, as further described below. COM-based API families 208 represent one or more APIs where functionality is described using a Component Object Model (COM) type system. Flat export based API families 210 represent one or more APIs where functionality is described using a method signature (i.e. a method signature including a method name, calling convention, number and type of method arguments). Flat export based APIs further represent APIs that are only identified by their name, and are not arranged into classes and/or an object-oriented manner. A programmer wanting to determine which APIs are available can manually and/or programmatically access descriptions of each API. For example, to determine what interfaces exist for new API families 206 and how to call them, the programmer can access associated metadata 212. While COM-based API families 208 and flat export-based API families 210 have associated language-independent type system descriptions in metadata 214 and 216 respectively, the programmer first writes wrapper code to map the language-independent type system description to the COM-based and/or flat export-based APIs.

Metadata 212, 214, and 216 can be configured to include information that describes various aspects of associated interface(s), such as version information, what methods are available, what parameters the interface(s) take, data types of the parameters, the order in which to pass the parameters, etc. In some embodiments, the metadata can include hierarchical information associated with an interface, such as information describing relationships between interface(s) and/or describing the interface(s) in an object-oriented manner. Metadata can be configured to include class descriptions, associated methods and parameters of a class, and the like. In some cases, one or more IDL file(s) can be extended to include some of these descriptions and used in the generation of one or more metadata file(s). In some cases, the metadata can be based, at least in part, upon one or more IDL file(s), as further described below.

Operating system 202 also includes application binary interface(s) (ABI) 218. An ABI describes, at a machine-level, a binary contract for calling functions, methods, APIs, and the like. The binary contract can include an identification or name associated with a function, a signature that can be used to call the function, an order of parameters passed to the function and/or data types associated with parameters, etc. Alternately or additionally, the binary contract can include definitions and/or rules for exposing behavior associated with at least one type of a type system. Typically, behavior associated with and/or defined by a binary contract does not change. For example, if a signature and/or identification of a binary contract remain constant, the associated behavior of the contract remains constant as well.

Application binary interface 218 represents functionality exposed through a binary that can be reliably invoked by other applications. In this example, application binary interface(s) 218 includes interfaces, base types, and base patterns associated with operating system component(s) 204. One or more application(s) external to operating system 202, such as application(s) 220, can access operating system components 204 via one or more application binary interface(s) 218.

Applications 220 can include one or more application(s) generated from one or more programming language(s), such as HTML, JavaScript, Visual Basic, C#, C++, and the like. In some embodiments, applications 220 include one or more call(s) into an operating system component. In some cases, application(s) 220 can be configured to first programmatically determine what interface(s) are available, and then make a call into one or more of the determined interface(s). In some cases application(s) 220 accesses the interface(s) through application binary interface(s) 218, with help from one or more generated language projection module(s) 222 as further described below.

In one or more embodiments, generated language projection module(s) 222 maps an abstract type system definition to a specific programming language. Any suitable programming language can be mapped, examples of which are provided above. In some embodiments, a generated language projection module can be unique for each programming language. In other embodiments, a generated language projection module can be multi-purpose and utilized by multiple programming languages. A mapping enables current and future interfaces that are described using the abstract type system to be accessible to a specific programming language without additional programming statements (i.e. a wrapper function). The mapping further allows a specific programming language to call an interface in a manner that is native to the specific programming language. Any suitable type of information can be mapped, such as classes, data types, function pointers, structures, and the like.

Consider an example where a programmer wants to access an operating system component. When writing an application, such as application(s) 220, the programmer generates source code in an editor/compiler associated with at least one specific programming language. The editor/compiler can be configured to access metadata file(s) in order to obtain information associated with what interfaces and/or APIs associated with the operating system are available. For example, in some embodiments, as the programmer writes a line of code that includes a call to a class implemented as part of an operating system component, the compiler/editor can query metadata associated with the class and return to the programmer a list of what methods, properties, and the like, are associated with the class. The list can include any sort of information, associated methods and/or properties of a class, and the like. Alternately or additionally, the list can include a list of available classes. In some embodiments, the information can be provided as part of an auto-completion feature configured to visually present relevant methods, properties, etc. of an interface to a user for selection. Upon selection of a method and/or property, the compiler/editor can insert corresponding syntax into the source code for more efficient and accurate source code generation.

In some embodiments, the programmer may write source code configured to instantiate a class object of the operating system components. When called at runtime, the operating system dynamically creates an instance of the class to hand back to the calling code. However, the instance handed back to the calling code can be an "abstract object", or an object described in an abstract type system associated with the operating system components, as further described below. In order to bridge between an abstract object type and a concrete data type of a programming language associated with the calling code, a compiler can be configured to translate and/or map the abstract object to comparable types in its associated programming language, such as through generated language projection module(s) 222. In some cases, a proxy can be used to bridge calls between an abstract object of the operating system components, and a concrete object associated with a programming language.

Consider a proxy configured to emulate behavior of an operating system component class. In some cases, a proxy can be created that includes stubs of associated types, methods, properties, events, interfaces, etc. of the class. The proxy can be constructed in a programming language of the calling code, thus enabling the code calling to access the proxy in a manner native to the calling code. The stubs can include appropriate knowledge and/or code to translate and/or map these calls to (and from) the operating system. For example, in some embodiments, the proxy can communicate with application binary interface(s) 218.

In some embodiments, a programming language can interject a wrapper function and/or proxy, as described above, to map an abstract type to a type that is native to the programming language. A programming language editor/compiler can be configured to read metadata, such as metadata files 212, 214, and 216, determine what abstract types are being used, map the abstract type(s) to one or more comparable type(s) in the associated program language, and wire an associated wrapper function and/or proxy to the abstract type associated with the operating system components. Once a mapping for each type exists between a programming language and the abstract type system, any current or future interfaces defined by the abstract type system can automatically be accessed by the programming language without additional coding from a programmer As an example, consider FIG. 3, which illustrates a flow diagram that describes steps in a method in accordance with one or more embodiments. The method can be performed by any suitable hardware, software, firmware, or combination thereof In at least some embodiments, aspects of the method are performed by software, such as editor/compiler module 114, executing on computing device 102.

Figure 3:
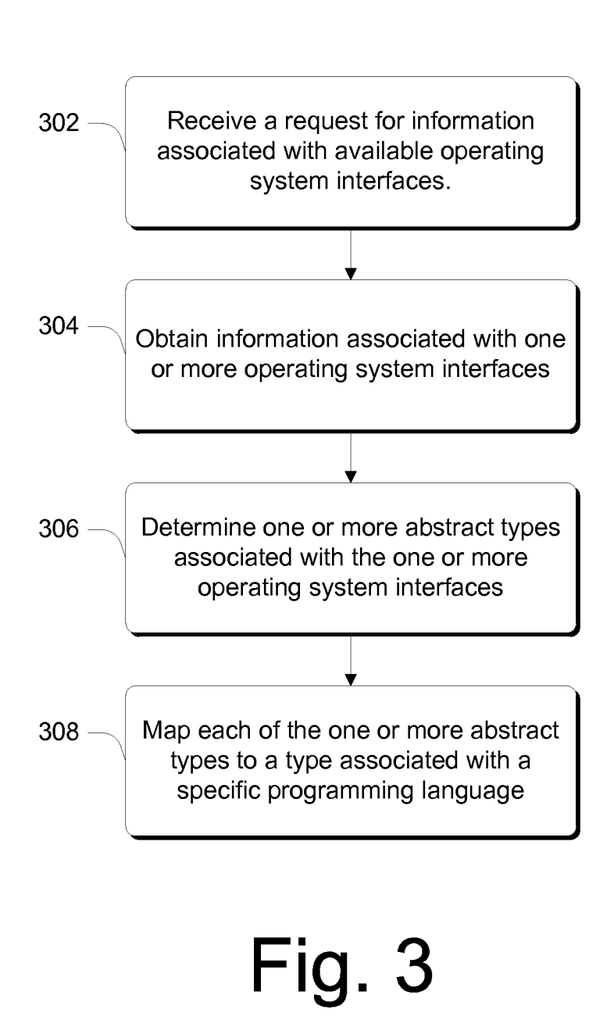
FIG. 3 is a flow diagram that describes steps in a method in accordance with one or more embodiments.

Step 302 receives a request for information associated with available operating system interfaces. For example, the request can be configured to request what interfaces are available, and/or other information associated with the available interfaces. This can be achieved in any suitable manner. In some embodiments, the request can be automatically generated by a source code editor in which source code is being developed. The code editor can identify a call to an operating system interface and/or component and, upon the identification, send a request for the available methods, properties, etc. associated with the operating system interface. In some embodiments, a request can be manually generated via selection of a drop-down menu, radio button, and the like. The request can be configured to request information associated with all available operating system interfaces, some available operating system interfaces, individual operating system interfaces, or any combination thereof In some embodiments, a request can be generated via a running application, such as application(s) 220 of FIG. 2.

Step 304 obtains the information associated with one or more operating system interface(s). For example, in some embodiments, the operating system can be queried for the information. Alternately or additionally, the information can be included in one or more metadata file(s) and obtained by querying and/or reading the metadata files. As described above and below, the metadata files can be in a machine-readable format, and include hierarchical information, such as object relationship formation associated with the interfaces.

Responsive to obtaining the information, step 306 determines one or more abstract type(s) associated with the one or more operating system interface(s). As described above, in some embodiments, an operating system interface can be described independent of a specific programming language through the use of an abstract type system. Responsive to determining the one or more abstract type(s) associated with the one or more operating system interface(s), step 310 maps each of the one or more abstract type(s) to a type associated with a specific programming language.

Consider an example of an interface description language describing an ABI to an OpenPicker runtime class. Included in the OpenPicker runtime class is a PickMultipleItems method configured to return a collection of FileItem objects. In this particular example, the FileItem class contains a GetProperties method configured to return a FileItemProperties object comprising a Name value.

```
runtimeclass OpenPicker {
    interface IOpenPicker;
}
interface IOpenPicker : IInspectable {
    HRESULT PickMultipleItems( [out, retval]
IVector<IFileItem*>* folder );
}
interface IFileItem : IInspectable {
    HRESULT GetProperties([out, retval]
FileItemProperties** retVal);
}
interface IFileItemProperties : IInspectable {
    [propget] HRESULT Name([out, retval] HSTRING
*value);
}
```

In some embodiments, a C# language compiler can map a description to C# language constructs. By mapping the description to language-specific constructs, the operating system interfaces can be accessed in a manner native to the C# programming language, as illustrated below:

```
OpenPicker picker = new OpenPicker( );
var items = picker.PickMultipleItems( );
foreach (FileItem item in items) {
    Display (item.GetProperties( ).Name);
}
```

In yet another example, a structure defined in language-independent manner can be mapped to a JavaScript object. Consider an example of a FrameRate structure defined using:

```
typedef struct FrameRate {
    UINT32 Numerator;
    UINT32 Denominator;
} FrameRate;
```

The FrameRate structure includes two UINT32 fields: Numerator and Denominator. Since the FrameRate structure is defined using language-independent terms, the structure can be accessed by various language-specific programming when using an appropriate mapping, such as being accessed through JavaScript. However, JavaScript does not include a concept of a structure containing fields, or a concept of unsigned 32-bit integers. Instead, JavaScript includes a concept of an object with properties and a concept of a Number. In this example, the above structure definition can be an object with two properties named Numerator and Denominator, both of type Number:

```
// JavaScript use of the above
var framerate = videoType.Framerate; // Get a framerate
object
var ratio = framerate.Numerator /
framerate.Denominator;
```

Having considered programmatically exposing operating system components to one or more programming language(s), consider now a discussion of modeling object-oriented languages with an abstract type system in accordance with one or more embodiments.

Modeling Object-Oriented Languages with an Abstract Type System

When an operating system interface has been defined using a specific programming language, parameters associated with the interface are characterized by data types of the specific programming language. In turn, callers of the interface conform to how the specific programming language defines the data types. For programs written in the specific programming language as the interface, conforming to the data types becomes trivial since the programs have the same data type definition. Programs not written in the specific programming language that call the interface may sometimes reduce their capabilities in order to conform to the data types. For example, a programmer calling the interface from a different programming language may add code to convert and/or bridge between the different programming languages and/or data types. As a consequence, the bridging process between the data types can oftentimes reduce functionality inherent to data types of the calling programming language. Additionally, this conversion can sometimes be complex and, in some cases, nonexistent if the different programming languages have differing concepts of what an object is.

Various embodiments provide an ability to model one or more interface(s) of an operating system, in an object-oriented manner, utilizing an abstract type system. In some embodiments, an extended IDL can include syntax to describe relationships between the one or more interface(s). Alternately or additionally, the extended IDL can include rules governing how an interface can be described and/or defined. In some embodiments, a binary contract can be configured to expose behavior associated the abstract type system, and further configured to include information associated with aggregated data types.

An object-oriented model describes objects using a class hierarchy, where a class can include methods, properties, inheritance, etc. Typically, but not necessarily, an object-oriented class includes one or more constructor(s). A constructor is a class function that, when called, creates an instance/object of the class in memory for use. Some constructors of the class contain additional code which prepares the created instance/object for use. For example, the additional code can initialize member variables of the class, run associated startup routines of the class, etc. A default constructor has no input parameters, while a non-default constructor has one or more input parameter(s).

In some embodiments, one or more constructor(s) of an operating system component can be constrained to follow particular implementation and/or designs. By following particular implementations, callers of the constructors can depend upon how the constructor and/or resultant object behaves. For example, a default constructor of an operating system component can be constrained and/or mapped to a default constructor of an ActivateInstance method of an IActivationFactory interface of a class factory object. A class factory object is a design pattern modeled to create objects without specifying an exact class of the created object. By using the class factory model, the default constructor can maintain a sufficient level of abstraction. Non-default constructors of the operating system component can also be constrained to be placed on one or more specially designated interface(s), such as alternate interfaces of the class factory.

One way to specify a description of an interface is through the use a descriptive language file, such as an extended description language like an IDL and/or XML. In some embodiments, the extended description language can be configured to enable an ability to describe and/or designate one or more constructor interface(s) of an operating system component. For example, consider a Compressor class, as illustrated below. In this example, the Compressor class declares its ICompressorFactory interface contains at least one definition of a non-default constructor method(s) associated with the class.

```
[version(NTDDI_WIN8), activatable(ICompressorFactory,
NTDDI_WIN8)]
runtimeclass Compressor {
    [default] interface ICompressor;
}
[version(NTDDI_WIN8),
uuid(5F3D96A4-2CFB-442C-A8BA-D7D11B039DA0)]
interface ICompressorFactory : IInspectable {
    HRESULT CreateCompressor([in]
Windows.Foundation.IOutputStream * UnderlyingStream, [in]
CompressAlgorithm Algorithm, [out, retval] Compressor
**CreatedCompressor);
}
```

These descriptions can be contained in one or more file(s) and used in conjunction with at least one compiler to generate one or more interface description(s) in a machine-readable format, as further described below.

An object-oriented class can be configured to include at least one static method, at least one static property, at least one static event, or any combination thereof Similar to constraining the definition of a constructor, the static methods, static properties and, and/or static events, can be designed to conform to one or more specifically designated interface(s). Consider an example of a CallControl class that declares static methods, properties and events. In this example, the static methods, properties, and events are defined in the ICallControlStatics interface:

```
[version(NTDDI_WIN8), uuid("03945AD5-85AB-40E1-AF19-
56C94303B019"), exclusiveto(CallControl)]
    interface ICallControlStatics: IInspectable
    {
        HRESULT GetDefault([out, retval] CallControl
**callControl);
        HRESULT FromId([in] HSTRING deviceInterfaceId,
[out, retval] CallControl **callControl);
    }
    // Runtime classes
    [version(NTDDI_WIN8),
    static(ICallControlStatics, NTDDI_WIN8)]
    runtimeclass CallControl{
        [default] interface ICallControl;
    }
```

An object-oriented class can be configured to include at least one instance method, at least one instance property, at least one instance event, or any combination thereof Instance members (methods, properties and events) operate on a specified instance of a class while static members are shared by all members of a class. A class can be designed to conform to one or more specifically designated interface(s), such as the above example where the CallControl class declares that its associated instance methods, properties and events are defined in the ICallControl interface. In some embodiments, one or more operating system component(s) can model/implement these interfaces after/on the class factory design pattern.

Whether a specific programming language calls a language-specific constructor, static or instance members, a language projection module, such as generated language projection module 222 of FIG. 2, can map the programming language-specific calls to an appropriate method and/or interface associated with the appropriate class factory object or instance. In some embodiments, the class factory object is associated with an operating system component and/or runtime class. For example, a method signature of code directing the compiler to create an instance of the runtime class can be matched to an appropriate constructor interface method of the class factory object. In yet another example, the language projection module can be configured to match a language-specific method signature directing the compiler to call a static method to the appropriate matching interface method on a static interface associated with the operating system component. In yet another example, the language projection module can be configured to match a language-specific method signature directing the compiler to call an instance method to an appropriate matching interface method on an interface associated with a particular instance of the operating system component.

In some embodiments, an IDL compiler can be configured to read one or more extended IDL file(s) associated with at least one operating system component interface description, and generate an associated machine-readable file. Any suitable type of information can be included in the extended IDL file, such as information describing types, methods, properties, events, and interfaces of an associated operating system component. In some cases, the compiler can generate a machine-readable metadata file. One or more application(s) can be configured to read the associated machine-readable file to programmatically determine what interface is available, associated descriptions and/or declarations of the interface, data types of parameters of the interface, etc. The one or more application(s) can be written in any suitable programming language, examples of which are provided above.

In some embodiments, the IDL compiler can generate one or more communication proxies and/or code stub(s) associated with the types, methods, properties, events, and/or interfaces. The communication proxies and/or code stubs can additionally be configured for access by an operating system component.

Figure 4:
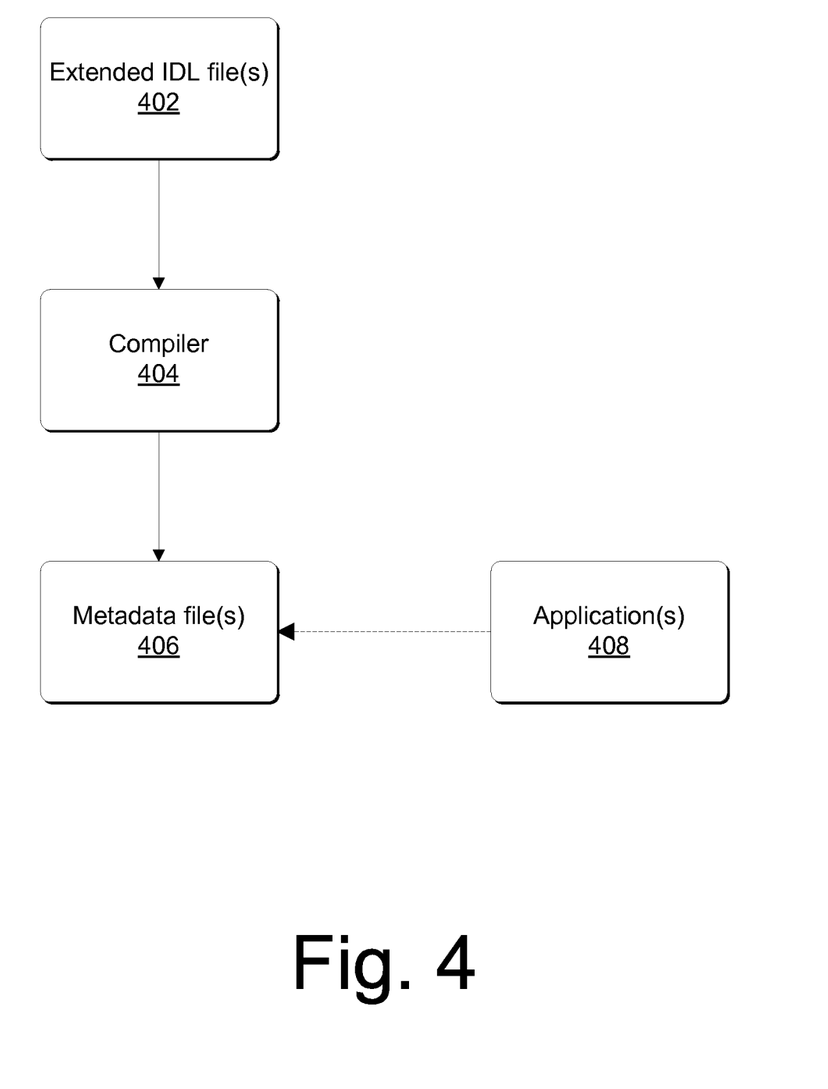
FIG. 4 illustrates a relationship diagram in accordance with one or more embodiments.

Consider FIG. 4, which illustrates a relationship between extended IDL file(s) 402, a compiler 404, and metadata file(s) 406 in accordance with one or more embodiments. Here, extended IDL file(s) 402 are received and processed by compiler 404 to produce metadata file(s) 406. In at least some embodiments, modules illustrated in the relationship can be implemented as software, hardware, or any combination thereof, such as editor/compiler module 114, executing on computing device 102.

In the illustrated and described embodiment, extended IDL file(s) 402 can include one or more files that define one or more operating system component interface(s), such as an operating system API. Any suitable type of operating system component can be described, such as a file object/class, a string object/class, a graphic object/class, a culture object/class, and the like. Each object can include methods, properties, inheritance information, etc., that can be associated with an object-oriented class. The extended IDL can include syntax to enable these types of relationships between the one or more interface(s) to be described. Alternately or additionally, the extended IDL can describe an abstract type system.

In some embodiments, the abstract type system can be configured to support and/or describe various data types. For example, a method interface can be defined to map a physical requirement that all interfaces operate on an instance of an object. In another example, the abstract type system can be used to define a function pointer that can be called across programming language and component boundaries. A first component can originate a function pointer, or a delegate, that is bound to a method. The delegate can then be passed across a binary compilation boundary to a second component written in an arbitrary programming language, and invoked. Various embodiments enable the extended IDL to define and/or describe these data types, to define rules for composing fundamental data types, as well as compounding the data types into aggregate types.

In the illustrated and described embodiment, compiler 404 accepts one or more input file(s), such as extended IDL file(s) 402, and produces one or more metadata file(s) 406. Metadata file(s) 406 can be configured for automated access. For example, the metadata files can be stored in a machine-readable format. In some embodiments, metadata file(s) 406 are associated with one or more operating system component(s). Alternately or additionally, compiler 404 can generate stubbed out communication proxies, as described above.

Application(s) 408 can dynamically determine what APIs are available, such as through reading metadata file(s) 406. In some embodiments, application(s) 408 can be configured as editor/compiler 114 of FIG. 1. Through metadata file(s) 406, an application can determine if later versions of functionality are present, what parameters an API takes, as well as inform a user what functionality for an API is present at runtime. Accordingly, by including API descriptions in a machine-readable format, as well as describing the APIs with an abstract type system, applications and/or languages that support the mapping between an abstract type system and a specific programming language have easy access to APIs with little effort from a programmer Having considered modeling object-oriented languages with an abstract type system, consider now a discussion of an example system in accordance with one or more embodiments.

Example System

Figure 5:
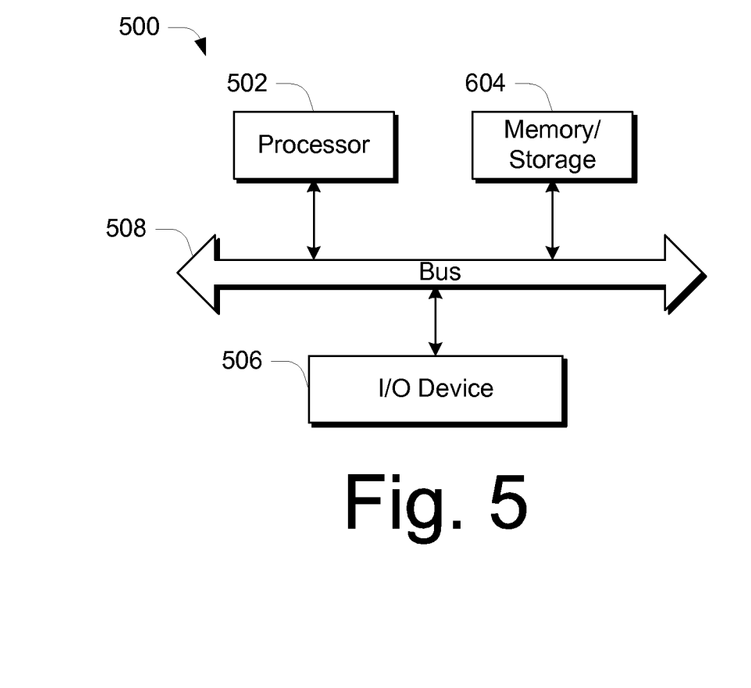
FIG. 5 illustrates an example system that can be utilized to implement one or more embodiments.

FIG. 5 illustrates an example computing device 500 that can be used to implement the various embodiments described above. Computing device 500 can be, for example, computing device 102 of FIG. 1 or any other suitable computing device.

Computing device 500 includes one or more processor(s) or processing unit(s) 502, one or more memory and/or storage component(s) 504, one or more input/output (I/O) device(s) 506, and a bus 506 that allows the various components and devices to communicate with one another. Bus 508 represents one or more of any of several types of bus structures, including a memory bus or memory controller, a peripheral bus, an accelerated graphics port, and a processor or local bus using any of a variety of bus architectures. Bus 508 can include wired and/or wireless buses.

Memory/storage component 504 represents one or more computer storage media. Component 504 can include volatile media (such as random access memory (RAM)) and/or non-volatile media (such as read only memory (ROM), Flash memory, optical disks, magnetic disks, and so forth). Component 504 can include fixed media (e.g., RAM, ROM, a fixed hard drive, etc.) as well as removable media (e.g., a Flash memory drive, a removable hard drive, an optical disk, and so forth).

One or more input/output device(s) 506 allow a user to enter commands and information to computing device 500, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer-readable storage media".

"Computer-readable storage media" include volatile and non-volatile, removable and non-removable media implemented in any method or technology for storage of information such as computer readable instructions, data structures, program modules, or other data. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Conclusion

Various embodiments provide an ability to describe, independent of a programming language, one or more interface(s) associated with an operating system. Alternately or additionally, a compiler associated with a specific programming language can be configured to map the independent interface description(s) to the appropriate constructs specific to the programming language. In some embodiments, an application can be configured to programmatically determine one or more interface(s) of the operating system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims

The invention claimed is:

1. A computer-implemented method comprising:
   receiving a request for information associated with one or more available operating system interfaces;
   obtaining the information associated with the one or more available operating system interfaces, the operating system interfaces being described using an abstract type system, wherein the abstract type system is configured to enable interface descriptions that are independent from specific programming languages, and wherein at least one description of an operating system interface includes calling parameter type descriptions;
   programmatically determining one or more abstract types associated with the one or more available operating system interfaces using at least one binary contract, wherein determining the one or more abstract types comprises determining behavior associated with the one or more abstract types, wherein the binary contract is configured to include machine-level definitions; and
   mapping individual determined abstract types to individual respective types associated with at least one specific programming language.

2. The computer-implemented method of claim 1, the information associated with the one or more available operating system interfaces further comprising hierarchical information.

3. The computer-implemented method of claim 1, the information comprising version information associated with at least one interface, data types of individual parameters associated with the at least one interface, and a calling order of the individual parameters associated with the at least one interface.

4. The computer-implemented method of claim 1, the obtaining information associated with the one or more available operating system interfaces comprising obtaining information programmatically from at least one metadata file.

5. The computer-implemented method of claim 1, wherein the binary contract includes one or more function signatures.

6. The computer-implemented method of claim 5, wherein the binary contract includes one or more function names.

7. One or more computer-readable storage memory comprising computer readable instructions which, responsive to execution by at least one processor, implement:
   one or more Application Programming Interface (API) modules configured to enable programmatic access to functionality associated with an operating system;
   one or more metadata files associated with the one or more API modules, the one or more metadata files configured to include at least one description of the one or more APIs, the at least one description using an abstract type system to describe programmatic access to the one or more APIs;
   one or more Application Binary Interface (ABI) modules configured to include one or more machine-level binary contracts for calling the one or more APIs; and
   one or more generated language projection modules configured to map at least one type of the abstract type system to at least one type of one or more specific programming languages, the abstract type system configured to enable API descriptions that are independent from the one or more specific programming language, including calling parameter type descriptions associated with the APIs.

8. The one or more computer-readable storage memory of claim 7 further comprising instructions which, responsive to execution by the at least one processor, implement:
   at least one application configured to programmatically determine at least one interface, included in the at least one API module, through the one or more metadata files.

9. The one or more computer-readable storage memory of claim 7, the generated language projection module comprising at least one proxy configured to emulate at least one type of the abstract type system in a manner native to the one or more specific programming languages.

10. The one or more computer-readable storage memory of claim 7, the binary contract for calling the one or more APIs comprising at least one behavior definition associated with at least one type of the abstract type system.

11. The one or more computer-readable storage memory of claim 7, the one or more API modules comprising an object-oriented class, the one or more metadata files configured to describe the object-oriented class in an object-oriented manner.

12. The one or more computer-readable storage memory of claim 11, the object-oriented class comprising a file class.

13. The one or more computer-readable storage memory of claim 7, the one or more metadata files configured to include information comprising version information associated with at least one API, data types of each parameter associated with at least one API, and a calling order of each parameter associated with at least one API.

14. One or more computer-readable storage memory embodying computer-executable instructions that are executable to:
   expose one or more features associated with an operating system using one or more interfaces;
   describe the one or more interfaces using an abstract type system and a description language, the description language configured to enable hierarchical descriptions of the one or more interfaces, the abstract type system configured to enable descriptions that are independent from specific programming languages, wherein at least one description includes calling parameter type descriptions associated with the one or more interfaces;
   generate one or more machine-readable descriptions of the one or more interfaces based, at least in part, on the abstract type system and description language;
   define one or more binary contracts associated with the abstract type system, the one or more binary contracts configured to include one or more rules describing behavior associated with at least one type of the abstract type system, the one or more binary contracts comprising machine-level definitions; and
   map the abstract type system to one or more specific programming languages based, at least in part, on the one or more binary contracts.

15. The one or more computer-readable storage memory of claim 14, the machine-readable descriptions comprising at least one metadata file.

16. The one or more computer-readable storage memory of claim 14, the at least one type of the abstract type system comprising a function pointer.

17. The one or more computer-readable storage memory of claim 14, the one or more interfaces comprising at least one object-oriented interface.

18. The one or more computer-readable storage memory of claim 14 further comprising instructions that are executable to generate at least one communication proxy associated with the one or more interfaces.

19. The one or more computer-readable storage memory of claim 14, the one or more features associated with the operating system constrained to an implementation following a class factory design pattern.

* * * * *